United States Patent [19]
Zimmermann et al.

[11] 3,972,490
[45] Aug. 3, 1976

[54] TRIFAN POWERED VSTOL AIRCRAFT

[75] Inventors: Vincent H. Zimmermann, Olivette; Horacio J. deGarcia, Jr., Maryland Heights; Harlan K. Pierson, Hazelwood, all of Mo.

[73] Assignee: McDonnell Douglas Corporation, St. Louis, Mo.

[22] Filed: Mar. 7, 1975

[21] Appl. No.: 556,293

[52] U.S. Cl. ............................. 244/12 B; 244/12 D; 244/55
[51] Int. Cl.² ................... B64C 15/14; B64C 29/00
[58] Field of Search .............. 244/12 B, 12 D, 12 R, 244/23 B, 23 D, 54, 55, 53 B, 15

[56] References Cited
UNITED STATES PATENTS

| | | | |
|---|---|---|---|
| 2,929,580 | 3/1960 | Ciolkosz | 244/12 D |
| 3,110,456 | 11/1963 | Creasey et al. | 244/12 B |
| 3,212,731 | 10/1965 | Kappus | 244/12 D |
| 3,362,659 | 1/1968 | Razak | 244/15 X |
| 3,469,803 | 9/1969 | Schmielau | 244/55 X |
| 3,592,415 | 7/1971 | Walley et al. | 244/55 |
| 3,739,580 | 6/1973 | Bland | 244/12 B |
| 3,835,643 | 9/1974 | De Garcia et al. | 244/12 D |

*Primary Examiner*—Trygve M. Blix
*Assistant Examiner*—Barry L. Kelmachter
*Attorney, Agent, or Firm*—Gravely, Lieder & Woodruff

[57] ABSTRACT

A vertical or short takeoff and landing aircraft (VSTOL) employing three high bypass turbotip fans disposed in the fuselage and faired into the upper surfaces of the wings, and driven by two gas generators to produce vertical lift and transition to cruise flight such that the tripod arrangement for the turbotip fans generates stable powered flight. In the foregoing aircraft the gas generator - turbotip fan is an integrated propulsion system having thrust vectoring devices and gas flow control valved ducts between the two gas generators and the three turbotip fans to provide all lift, control transition and cruise functions, and in which the gas flow system produces variations in bypass ratios for the various modes of operation. Furthermore, in the foregoing aircraft the lift/cruise nacelles are positioned over the wing and blended into the upper wing surface and the adjacent fuselage to achieve high induced lift through supercirculation over the wing to produce stable flight and reduce sensitivity to gust conditions at low air speeds.

13 Claims, 14 Drawing Figures

TRIFAN POWERED VSTOL AIRCRAFT

SUMMARY OF THE INVENTION

This invention relates to fixed wing vertical and short takeoff and landing aircraft, more particularly denoted in the art as VSTOL aircraft.

The growth in helicopter mission applications has now stabilized because the performance has been stretched to the point where departures from rotary wing principles are necessary to realize significant improvements in all around capability. There is a need for military and commercial hybrid aircraft which can achieve VSTOL flight modes by combining the capability of the helicopter with the basic characteristics of speed, range, payload, altitude, and operational features of conventional fixed wing aircraft.

Capability of obtaining vertical and short takeoff and landing with fixed wing aircraft is exceedingly difficult, especially with sufficient efficiency and controllability to make it practical, even though the prior art has offered disclosures. The area of great difficulty with aircraft in this class is achieving integration of lift, control transition between vertical and horizontal flight, and cruise flight with significant eficiency, low-cost and low-risk, and with due regard for operating environmental conditions.

Many concepts have been proposed to achieve VSTOL performance. The known concepts and prototypes have independent propulsion and control systems for achieving powered lift and conventional cruise flights. The challenge is that the hybrid aircraft should utilize the same propulsion and control systems in an integrated manner during all phases of powered lift including transition to cruise flight with its conventional aerodynamic surface controls. It is this challenge which the present invention has met.

The present invention embodies high bypass cruise fans disposed to be faired into the upper surface of the wings and adjacent the fuselage, two gas generating engines located in the fuselage and delivering controllable gas flow to drive the cruise fans, as well as a vertical lift fan arranged in the nose of the fuselage to provide a stable tripod of lifting forces in conjunction with thrust vectoring hoods at the cruise fans and adjustable louvers at the nose fan.

The trifan powered VSTOL aircraft comprising the present invention has two gas generators driving three similar turbotip fans with interconnect ducts and appropriate valves to distribute the flow properly for all conditions of VSTOL powered lift flight as well as during conventional airplane flight. Twin lift/cruise fans are located above and faired into the wing adjacent to each side of the fuselage and gas generators are placed in the fuselage immediately forward of the tubotip fans to produce a compact nonconcentric relationship of turbofan and engine. The third fan of this interconnected system is located in the forward fuselage. Thrust of the lift/cruise fans is vectored vertically so that together with the thrust of the forward fuselage-mounted lift fan the aircraft is provided with a stable tripod of lifting forces for VSTOL operation.

It is known in vertical lift aircraft that secondary air entrained by exhausting units when the aircraft is close to the ground creates negative pressures on the aircraft causing lift loss. These ground effect losses can become quite large if the lift system arrangement is located centrally of or close to the center of gravity of the aircraft such that all the flow is outward from the center creating negative pressures over large areas of the aircraft. However, when the lifting units are spaced apart in locations where it is possible to capitalize on the fountain effects created by the downwash impingement flows, these fountains produce positive pressures that cancel the negative pressures caused by the outward flow where the fountain does not exist. The proper spacing of the lifting units with respect to their diameter and aircraft physical shape can actually result in a slight positive lift effect without producing undesirable pitching moments. The proper spacing of the tripod thrust arrangement of the present invention has been shown analytically and by test to overcome the propulsion/aerodynamic interference effects which cause lift loss.

It is important in any VSTOL aircraft to achieve as must induced lift as possible. This also depends on the spacing of the lifting units, the location of the lift units with respect to the aerodynamic surfaces, and the location of the inlets and exhausts. It has been determined that the lift/cruise fans on top of the wing produce very large positive induced lift. In order to maximize this beneficial induced lift effect it is necessary to place the exit of the thrust vectoring system located with its thrust center on the local wing chord aft of the trailing edge of the wing. The inlet chordwise location dictates a nacelle as short as possible. This has been achieved in the present invention by locating the nacelle inlets aligned on or aft of the quarter chord of the wing mean aerodynamic chord. In addition, the arrangement of the trifan powered aircraft provides a very good match between the center-of-gravity, center of thrust, and aerodynamic center which avoids large trim moments and adverse stability characeristics.

As the aircraft begins the transition from powered lift to cruise, it is necessary to maintain thrust moment equilibrium about the center of gravity so that the control capability built into the aircraft can be used for trim and maneuver control. The present invention utilizes a simple and relatively linear schedule of thrust vector angles. The advantage of this one-to-one vector relationship is that the maximum acceleration for short takeoffs and transition is possible while maintaining moment balance.

The objects of this invention are to provide high bypass ratio engines to vertical, transitional and cruise flight modes for otherwise conventional aircraft having VSTOL capability, to provide substantially high performance VSTOL aircraft with ability to handle payloads equal to or in excess of more conventional aircraft, to provide an aircraft of the foregoing character with the capability of vertical takeoff at relatively low pressure ratio and efficient cruise flight at a higher pressure ratio, to provide an aircraft with a system of flight vectoring fans to generate vertical thrust in a stable tripod configuration, and to provide an energy transfer control system to the interoperational thrust fans so that differential thrust modulation for aircraft control in subaerodynamic flight may be obtained.

It is an additional object of this invention to develop air flow around a fixed airfoil lifting surface in a VSTOL aircraft so that peak lift/cruise performance may be achieved with the greatly desired result that augmented wing lift at relatively low takeoff speed will minimize gust sensitivity and allow the use of high-lift wing technology and low wing loading.

Still another object of this invention is to provide an aircraft of the foregoing character with the cruise fan installation at the faired intersection of the wing upper surface with the fuselage to maintain a uniformly controlled upper wing surface boundary layer while retaining positive control of the thrust vector in order to induce increased positive circulation around the wing cruise fan nacelle combination at low aircraft forward velocity.

These and other objects and advantages of this invention will be set forth in more detail in the following description of a presently preferred embodiment shown in the accompanying drawings.

The aircraft in which this invention is incorporated makes use of certain structural features heretofore disclosed in the prior U.S. Pat. No. 3,835,643 issued Sept. 17, 1974 and assigned to the assignee of this application. In that prior patent the disclosure was made of nested toroid nozzle apparatus which could be applied to VSTOL aircraft and to that extent the present disclosure has incorporated the mechanical apparatus and the means by which the nozzles can be extended, retracted and also rotated for yaw control. Similarly, this invention has incorporated certain features of the prior U.S. Pat. No. 3,739,580 issued June 19, 1973 and assigned to the assignee of this application. The principles of that prior patent relating to propulsion of thrust generating fans are incorporated in this application. Thus, this application adopts by reference the substance of those prior and makes use of it in a new and unique manner to be set forth hereinafter. While the foregoing identified patents disclose certain known features for nested toroid nozzles, and of control means for the propulsion system, it is to be understood that other means and control systems may be used.

DESCRIPTION OF THE DRAWINGS

In the accompanying drawings which form part of the specification and wherein like numerals and letters refer to like parts wherever they occur.

DESCRIPTION OF THE PREFERRED EMBODIMENTS

Figure 1:
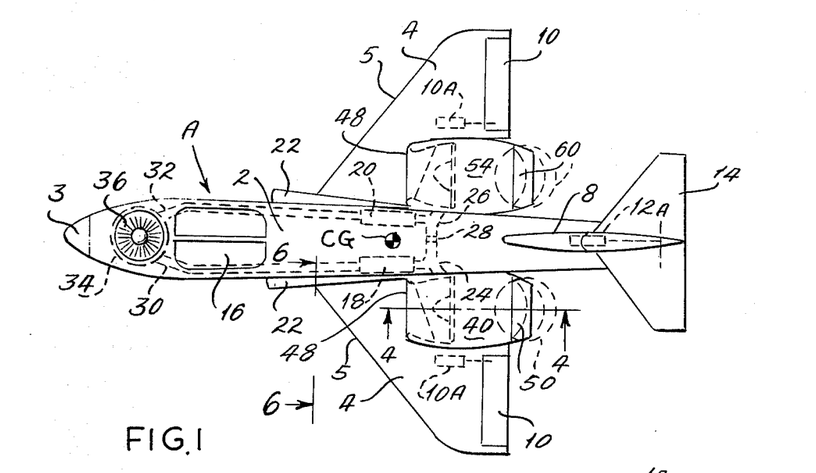
FIG. 1 is a plan view of the aircraft of the present invention showing the arrangement of components, and in which the nacelle vectoring apparatus is depicted in their cruise positions (full lines) and also in their lift positions (dotted lines)
Figures 2, 2A, 6:
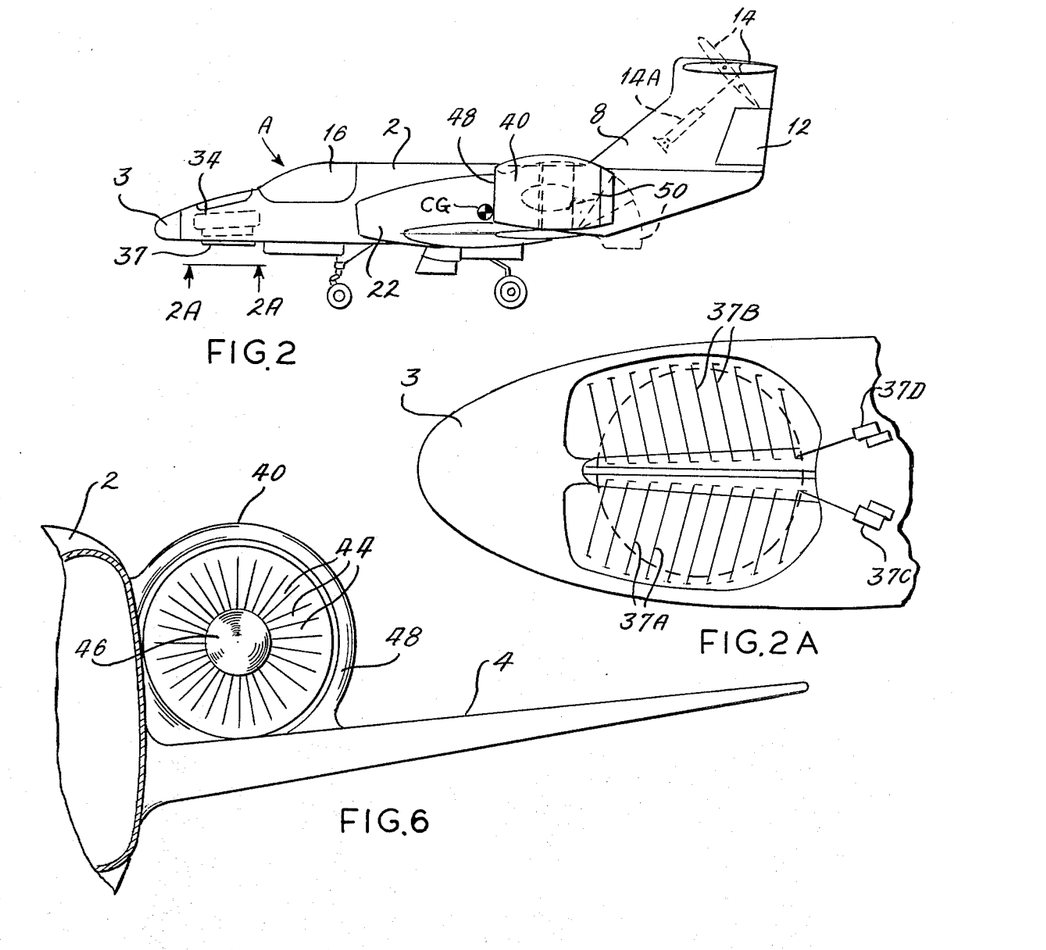
FIG. 2 is a side elevational view of the aircraft of FIG. 1.
FIG. 2A is a fragmentary view taken along line 2A—2A in FIG. 2 to show the louvered vectoring member associated with a nose fan.
FIG. 6 is a fragmentary front view of the nacelle taken along line 6—6 in FIG. 1.
Figure 3:
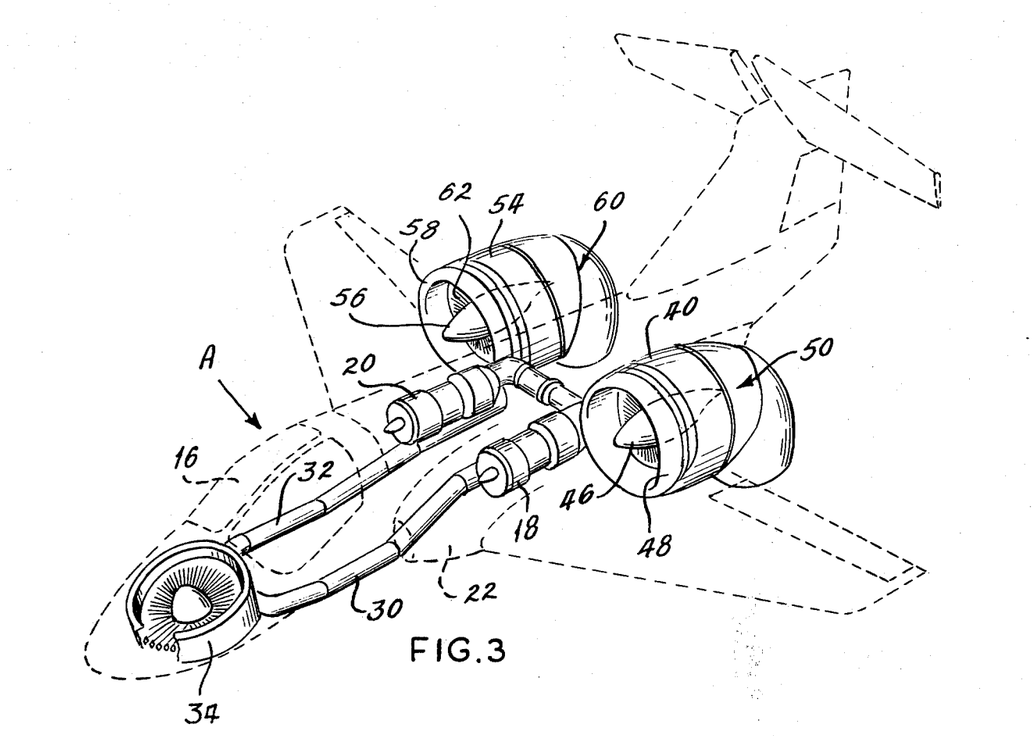
FIG. 3 is an enlarged perspective view of the aircraft in phantom outline showing the thrust components (in full line) in greater detail, such as the gas turbine engines, fans, ducting system, fan nacelles, and vectoring apparatus.

A preferred embodiment of an aircraft incorporating the several components, later to be described, which make it possible for vertical or short takeoff and landing operations is shown in FIGS. 1 and 2, and in greater detail in FIG. 3. The aircraft A is provided with a fuselage 2 which is aerodynamically configured from the nose 3 aft to the empennage which embodies a vertical surface 8 supporting a rudder 12,. and an all movable horizontal surface 14 supported on the vertical surface 8. The cockpit is located under the canopy 16, and suitable pilot control means, to be described, is disposed in the cockpit area in the normally understood arrangement. The fuselage 2 is provided with fixed wing 4 which projects out symmetrically on opposite sides of the longitudinal axis of the fuselage, and the wing portions on each side of the fuselage are formed with a swept leading edge 5 and a trailing edge which supports ailerons 10.

The propulsion system for the aircraft is seen in greater detail in FIGS. 3, 4, 5 and 8. In general there are disposed submerged within the fuselage a pair of gas turbines 18 and 20, and each has its own air inlet duct 22 which delivers ambient air into the gas turbines for the support of combustion. The exhaust gases from turbine engine 18 flows into a suitable duct 24, and the exhaust gas from turbine 20 flows into a similar exhaust duct 26. These ducts 24 and 26 are cross-connected at a valve ring 28. In addition, the exhaust duct 24 for the turbine engine 18 is connected to a gas duct 30, and a similar gas duct 32 is connected to the exhaust duct 26 for the turbine engine 20. The respective ducts 30 and 32 are directed forwardly through the fuselage 2 and along each side of the cockpit 16 to the manifold ring 34 which forms a shroud for a turbine tip fan 36. The manifold ring 34 is mounted above a controllable louver thrust directing member 37 to be described presently.

The exhaust gas duct 24 from the turbine engine 18 is directed into a gas flow manifold 38 (FIGS. 4 and 5) disposed in a wing mounted nacelle 40 for the purpose of driving turbine blades 42 carried on the tips of the blades 44 of a fan 46. The fan 46 is suitably mounted in the nacelle 40 to receive ambient air through the forwardly opening lip 48 and exhausting the same through a controllable toroid nozzle 50 which will be described presently in more detail.

Figure 4:
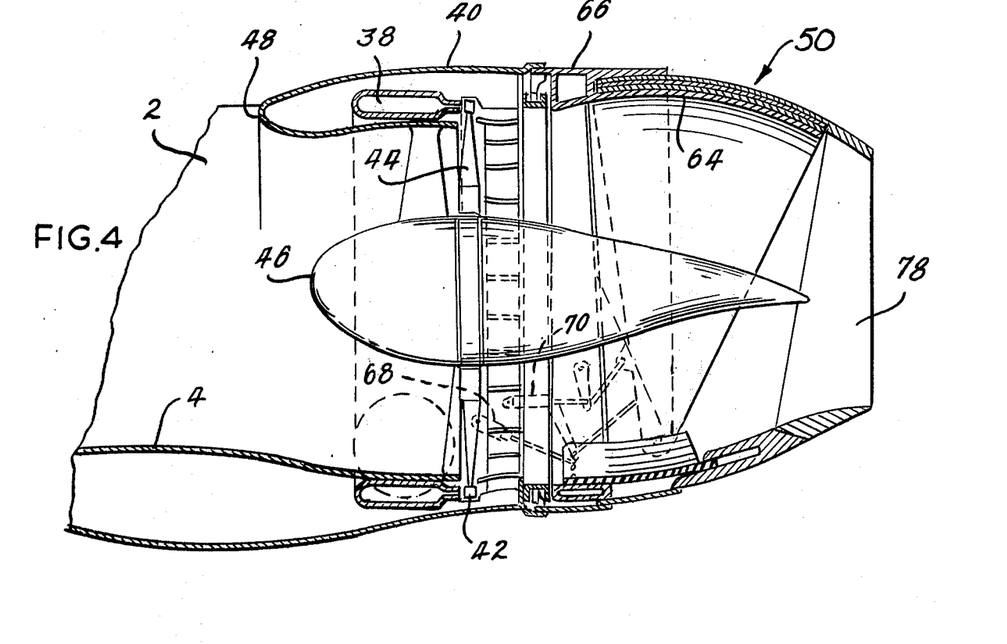
FIG. 4 is a sectional view taken along lines 4—4 of FIG. 1 and showing the wing and the nacelle with the vectoring apparatus of the nacelle in its cruise position.
Figures 5, 7:
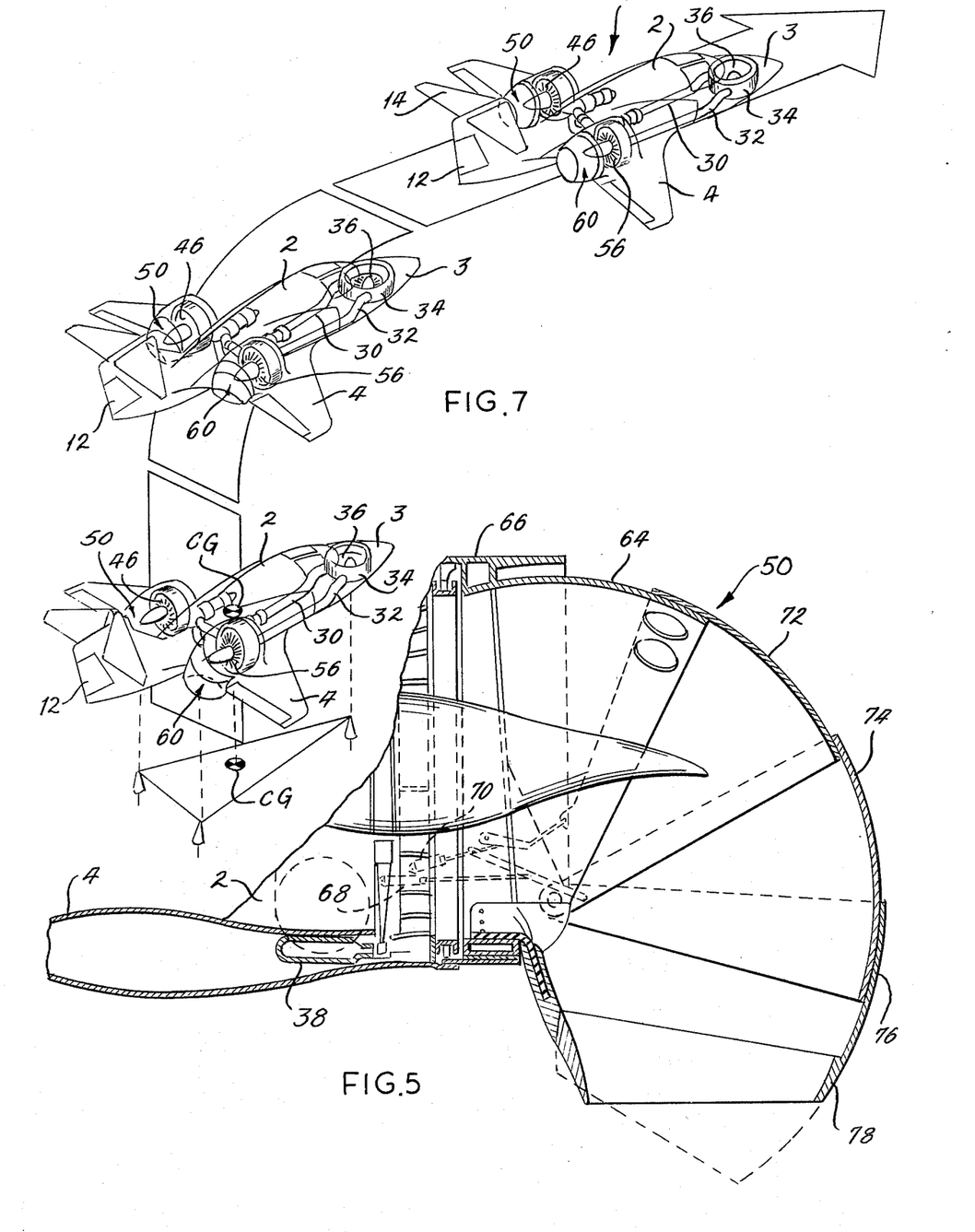
FIG. 5 is a sectional view similar to FIG. 4, but showing the vectoring apparatus in its vertical lift position (full lines) and also in its reverse thrust position (dotted lines)
FIG. 7 is a perspective view showing the three modes of flight for the aircraft and the stable supporting tripod created by the three fans during vertical flight.

The opposite gas turbine 20 has its exhaust gas duct 26 connected into a manifold 52 mounted in a nacelle 54 at the opposite side of the fuselage 2 which again operatively supports a fan 56 receiving ambient air through the forward lip 58 of the nacelle and exhausting the air through a controllable toroid nozzle 60. The gas flow maifold 52 delivers the gas to drive turbine blades on the tips of the fan blades 62.

Referring now to FIGS. 3, 4, 5 and 7, it can be seen that the nacelle 40 encloses the hot gas manifold 38 and is disposed on the upper surface of the wing 4 so that the exhaust nozzle 50 is positioned aft of the trailing edge of the wing. The nacelle 40 is made up of a stationary hood 64 mounted in a ring structure 66 which supports suitable operating mechanism 68 and 70 for extending or retracting movable hoods 72, 74 and 76. Hood 76 carries the exhaust nozzle ring 78, while the intermediate hoods 72 and 74 maintain continuity in defining the air outlet paths which may be controlled to direct the flow directly aft or in a longitudinal direction from the nozzle 78 as shown in FIG. 4, or in a vertically downwardly directed path when the movable hoods 72, 74 and 76 are actuated by the mechanism 68 and 70 into the position shown in full line in FIG. 5. What has been described for the nacelle and nozzle arrangement in FIGS. 4 and 5 applies with equal effect to the nacelle 54 on the opposite side of the fuselage.

Turning now to FIG. 7, there is shown a flight regime in which the aircraft A has the adjustable toroid nozzles 50 and 60 extended as shown in the position in full line in FIG. 5, so that the flow is directed generally vertically downwardly so as to generate spaced thrust columns on opposite sides of the longitudinal axis of the fuselage 2, and at the same time the hot gases from the turbine engines 18 and 20 will flow through the ducts 30 and 32 into the manifold 34 located in the nose of the fuselage to generate a third generally vertically downwardly directed air flow. It can be seen that there is generated three vertically directed columns of air arranged in a tripod configuration with the center of gravity (CG) of the craft A disposed within the boundary of the tripod thereby providing a vertical lift reaction which elevates the craft in its inital take-off.

As shown in FIG. 7, the aircraft A may be maneuvered in a subaerodynamic takeoff path where the three fans are developing vertically downwardly directed thrusts, and as the aircraft attains a sufficient altitude the toroid nozzles 50 and 60 are gradually retracted from the position shown in FIG. 5 to the fully retracted cruise position shown in FIG. 4 when the aircraft has completed its transition from the vertical flight attitude to horizontal flight attitude. Concurrently with retraction of the nozzles 50 and 60, the louver member 37 is adjusted to direct the thrust in a gradual rearwardly oriented direction to balance the longitudinal attitude of the aircraft A, as will be explained presently.

Figures 8, 8A, 8B, 8C, 8D:
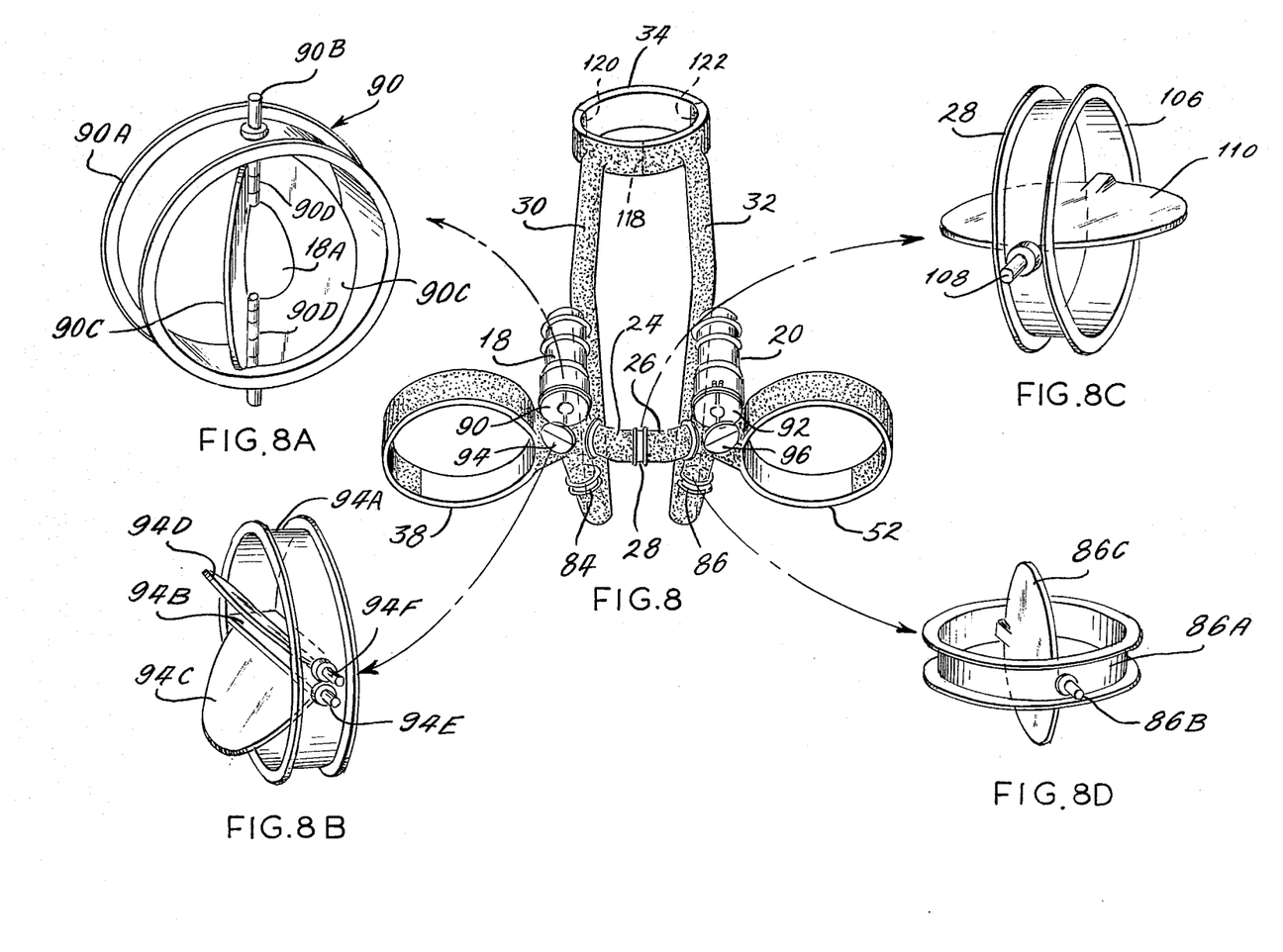
FIG. 8 is a schematic view of the configuration of the gas generator engines and duct system connected to the manifold rings in the wing mounted nacelles and in the manifold ring mounted in the aircraft nose.
FIG. 8A is an enlarged detail of the engine isolation valve for each of the engines of FIG. 8.
FIG. 8B is a similar detail of the split entry valve associated with each wing mounted manifold.
FIG. 8C is a similar detail of the interconnect valve employed for cross-connecting the engine duct systems.
FIG. 8D is a similar detail of the valve in each duct connecting the engines with the forward manifold ring.
Figure 9:
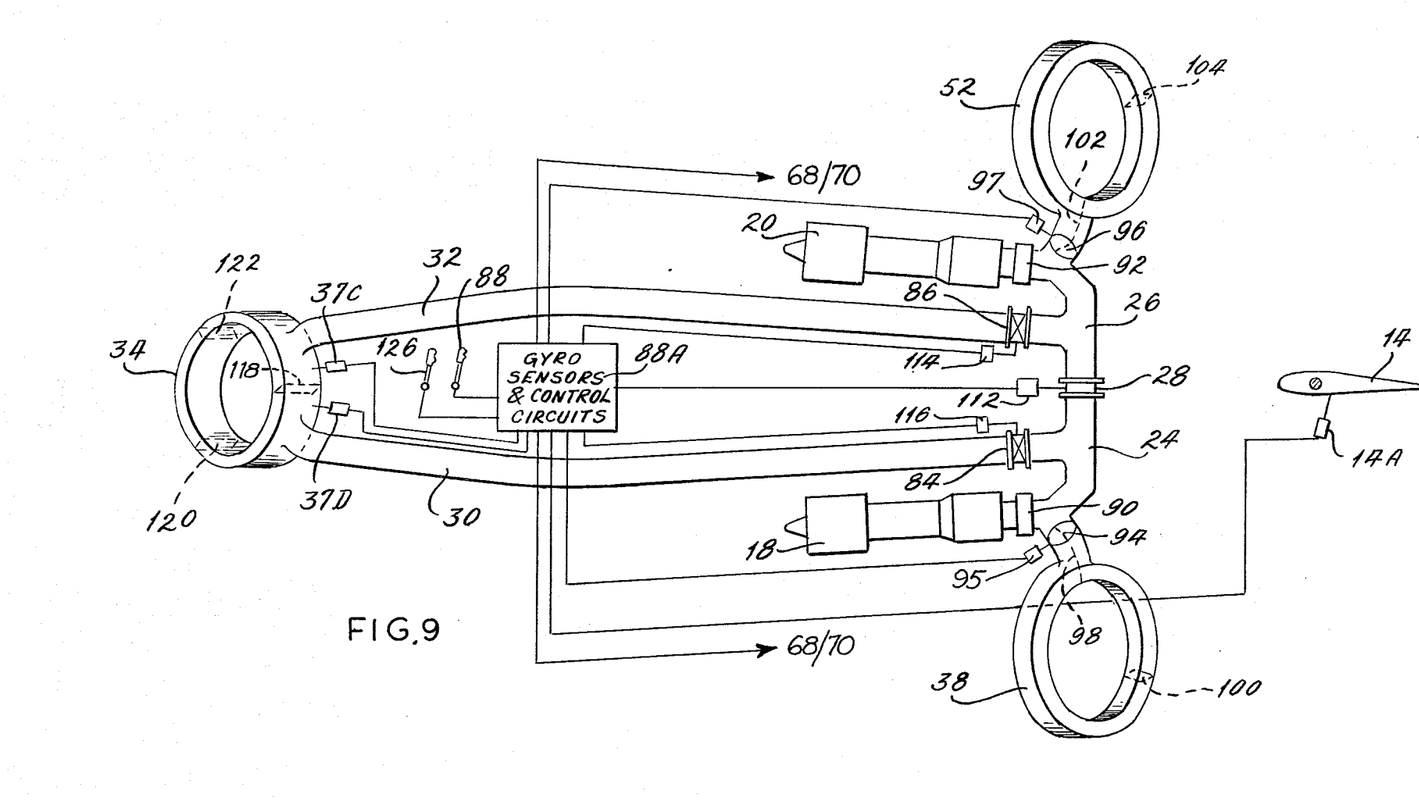
FIG. 9 is a schematic view of a control system commanded by the pilot and operative to program the several valves of FIG. 8, and the flight control surfaces of FIG. 1.

It is seen in FIGS. 8, 8A and 9 that the hot gas exhaust duct 24 is provided with an isolation valve 90, that the hot gas duct 26 is provided with an isolation valve 92, that the forwardly directed duct 30 is provided with a control valve 84 and a similar valve 86 is provided in the opposite and forwardly directed duct 32. The several control valves are under the selective control of the pilot through a control lever 88 which operates through a central control station 88A for the purpose of permitting the pilot during the vertical flight takeoff regime to maintain the aircraft in a stable position by varying the thrust effect from any one or more of the fans 36, 46 and 56, as well as the rudder 12, elevator 14, and ailerons 10. This control enables the pilot to correct for pitch or roll or yaw of the aircraft. Yaw control is obtained by providing the louver member 37 in the nose of the fuselage with two sets of thrust vectoring louvers 37A and 37B which direct the air flow to either side of the longitudinal vertical plane of the aircraft, as well as rearwardly, so as to maintain a desired heading for the aircraft. The louver set 37A is adjusted by actuator 37c, and the other louver set 37B is adjusted by actuator 37D. Similarly, suitable motor actuator 14A moves the elevator 14, motor actuator 12A moves the rudder 12, and actuators 10A move the ailerons 10.

In FIG. 8 and the related views of this drawing, it is seen that each engine 18 and 20 is provided with an exhaust isolation valve 90 and 92 respectively. The valves are the same and a description of valve 90 will cover the other valve 92. The valve 90 in FIG. 8A comprises a collar 90A, a pivot 90B, a pair of valve elements 90C mounted on the shaft 90B, and spring hinge means 90D on the shaft and normally acting to close the valve elements 90C around the bullet 18A centered in the engine exhaust. Both valve elements 90C normally close to isolate the engine 18 when it is inoperative or to prevent back pressure from the other engine.

Each exhaust duct 24 and 26 leads to its adjacent manifold ring 38 and 52 respectively, and the connection of ducts 24 at ring 38 is through a split entry valve 94 while duct 26 is connected to ring 52 through a similar split entry valve 96. In FIG. 8B the valve 94 comprises a collar 94A having a diametral divider wall 94B and a pair of valve elements 94C and 94D on opposite sides of the wall 94B. Valve element 94C is actuated by shaft 94E and a concentric shaft 94F actuates valve element 94D. These shafts are actuated by motor means contained in a drive unit 95. The valve 96 at manifold ring 52 is of like arrangement and the shafts are connected to actuator motor means 97. It is shown in FIGS. 8 and 9 that the manifold 38 has a dam or wall 98 which is located to divide the manifold entry into two paths, and a second wall 100 in the manifold is located to divide the manifold into two sections between the entry wall 98 and the second wall 100. One section extends for about one-third of the circumferential extent of the manifold and the other section takes in the remaining about two-thirds of the manifold. Similarly the opposite manifold 52 has its entrance divided by a wall 102 to direct the gas flow in either directions, and a wall 104 divides the manifold into sections which encompass about one-third and two-thirds of the entire manifold. As explained above, the motor means 95 and 97 at the split entry valves 94 and 96, respectively, actuate the respective valve elements to close either section while the other section is open, or to open both valve elements. This actuation is selected to meet certain operating conditions as will be explained presently.

Further in FIGS. 8, 8C and 9 there is shown an interconnect valve 28 which in FIG. 8C comprises a collar 106 connecting the engine exhaust ducts 24 and 26. The collar supports a shaft 108 on which a valve element 110 is mounted, and motor means 112 actuates the shaft to open and close the valve.

In FIGS. 8, 8D and 9 there can be seen the placement of valves 84 and 86 which are the same, and a description of valve 86 will apply equally to valve 84. A collar 86A is disposed in the duct 32 where it joins the engine exhaust duct 26, and a shaft 86B in the collar supports a valve element 86C. Motor means 114 is connected to shaft 86B to position the valve 86C as desired. A similar motor means 116 is connected to the shaft for the other valve 84. These valves 84 and 86 control the flow of the engine gases through ducts 30 and 32, respectively, to the manifold 34 in the nose 3 of the aircraft A. As shown in FIGS. 8 and 9 the manifold 34 is divided into sections of about one-third the total extent by walls 118, 120 and 122. Duct 30 is open to the section between walls 118 and 120, while duct 32 is open to the section between walls 118 and 122.

There is shown in FIG. 9 a schematic layout of the control means for the various components which require actuation at various times in the several flight modes. For example, the pilot is provided with a control stick 126 which is connected into the control center 88A which contains the necessary circuits and gyro sensors which relate the attitude of the aircraft in its three axis of motion which are pitch, roll and yaw. The pilot through the stick 126 and foot pedals (not shown) connected to the rudder 12 and the control center 88A can maneuver the aircraft as required. The pilot is also provided with the transition control stick 88 connected into the same control center 88A for operating the actuators 37C and 37D connected to louver 37A and 37B in the nose vectoring means 37. The control center 88A is also connected to the respective actuators 68 and 70 in the nacelles 40 and 54 for extending or retracting the thrust vectoring hoods 50 and 60. Furthermore, the control center 88A is connected to the elevator 14 to pitch this surface to the dotted line position of FIG. 2 when the vertical takeoff flight mode is selected. In addition, the pilot has the usual throttle for each engine 18 and 20 to regulate the output to meet the requirements of the prevailing flight mode.

An important feature of the present aircraft configuration is seen in FIGS. 1, 2 and 6 where the lower portion of lip 48 for the nacelle 40 is faired into the upper surface of the wing 4 and a side portion of this lip 48 also if faired into the adjacent surface of the fuselage 2. The nacelle 54 on the opposite side of the fuselage is similarly faired into the upper surface of the wing 4 and into the adjacent surface of the fuselage 2. This arrangement establishes boosted aerodynamic circulation, since the aft over-the-wing location of the respective nacelles with lip portion of the inlets 48 and 58 faired into and being flush with the upper surface of the wing 4 maintains a uniformly controlled upper wing surface boundary layer and positive control of the thrust vector selected for the toroid nozzles which results in inducing increased positive circulation around the wing-nacelle combination at very low aircraft forward velocity. There is the further good effect obtained in this placement of the nacelles and that is the aircraft has a reduced profile drag by fairing the indicated portions of the nacelle into both the fuselage and the wing. Still further, by placing the nacelles in an aft over-the-wing position the toroid nozzles are given a sufficient ground clearance spacing for the effective operation of vertical take-off as shown in FIG. 7. Within the structural requirements of the nacelles to support the internal components, the entrance lips 48 and 58 are located rearwardly of the quarter chord point as determined on the mean aerodynamic chord. When these dimensions have been determined it will be found that the center of thrust from the nozzles 50 and 60, when extended for vertical flight takeoff, will be at approximately 1.15 of the local chord aft of the trailing edge of wing 4. However, this location may vary between 1.10 and 1.20. This installation determination for the nacelles 40 and 54 will develop the maximum benefit of the induced lift effect, when combined with nacelles as short as possible.

In the present aircraft A for vertical takeoff, the center of thrust of the nozzles 50 and 60 is spaced rearwardly of the center of gravity a distance which is one-half the distance from the center of gravity to the center of thrust of the nose fan 36. The fans 36, 46 and 56 are all similar and are expected to develop similar thrusts so that two fans spaced a given distance aft of the CG will be balanced by one fan at twice the given distance forward of the CG. As the transition toward horizontal flight takes place, the direction of thrust from the three fans is given an increasing horizontal component and the resultant thrust vectors are on opposite sides of the CG, but remain nearly balanced since the nose fan thrust resultant will continue to have a moment arm from the CG twice as long as the moment arm of the fan thrusts from nozzles 50 and 60 on the opposite side of the CG. With the moments in balance or nearly so, it is much easier to effect trim and maneuver control.

OPERATION

The aircraft A is capable of three basic modes of flight, namely, vertical, transition, and cruise (FIG. 7). In the vertical takeoff mode the thrust of the air flow generated by the fans 36, 46 and 56 is directed downwardly, and substantially all lift is derived from the downwardly directed thrust. The spacing of the thrust columns develops a fountain effect which produces some positive pressure on the aircraft to aid in its lift off.

In the cruise mode the lift fan 36 is not utilized, but the fans 46 and 56 are used with the thrust of the airflow therefrom being directed rearwardly as in FIG. 4, so that a forward propulsive thrust is exerted on the aircraft A. The wing 4 provides the lift during the cruise mode, while the ailerons 10, elevator 14, and rudder 12 are utilized for control.

During the transition mode the thrust of the air discharged from the fans 36, 46 and 56 is directed at an angle so to provide both upward and forward thrust. As a result, the aircraft A experiences some forward motion so the wing 4 provides a limited amount of lift, but not enough to keep the aircraft A airborne. The remaining lift is supplied by the thrust from the downwardly directed air streams. Some control during the transition mode is available from the ailerons 10, rudder 12, and elevator 14, while additional control is derived by vectoring the airstream discharged from fan 36 and by differentially modulating the thrust exerted by the fans 36, 46 and 56. STOL flight is the same as the transition mode, only the aircraft A takes off and lands in the transition setting instead of the setting for the vertical mode. Both gas turbine engines 18 and 20 are utilized in all modes as are the two fans 46 and 56.

In the lift or vertical mode, the shutoff valves 84 and 86 at the entrances to the longitudinal ducts 30 and 32 are opened and the louvers in member 37 beneath the lift fan 36 are directed generally downwardly. This enables high energy gases from both engines 18 and 20 to flow through the longitudinal ducts and into the manifold 34 for the lift fan 36. Consequently, the fan 36 is driven and generates a downward airstream which results is an upwardly directed thrust on the nose of the fuselage 2.

The high energy gases from the engines 18 and 20 also flow to the manifolds 38 and 52 of the fans 46 and 56 during the vertical mode and these fans draw air through the nacelles 40 and 54. However, during the vertical mode the nozzles 50 and 60 are oriented downwardly as in FIG. 5, so that the airstreams created by the fans are discharged vertically downwardly, thereby creating lift aft of the trailing edge of the wing 4.

The three fans 36, 46 and 56 when so operated generate a total thrust which exceeds the weight of the aircraft A, and as a result the aircraft A lifts off the ground. Since the three fans possess about equal thrust capacity and since the distance between the two nozzles 50 and 60 and the center of gravity for the aircraft A is about one-half the distance between lift fan 36 and the center of gravity, the moments about the center of gravity are substantially equal and the aircraft A remains stable during the ascent. Moreover, in view of the fact that the nacelles 40 and 54 and engines 18 and 20 are mounted in a compact manner, which coupled with the small area of the wing 4 makes the aircraft quite easy to control about the roll axis. In short, the aircraft A is supported by the downwash fountains from the three spaced fans 36, 46 and 56 which are so spaced from the aircraft c. g. that a positive pressure is experienced in the area of the c. g. which assists the lift.

Control of the attitude of the aircraft A during the vertical mode is provided by changing the position of the vectoring louvers in member 37 beneath the fan 36 in the nose of the fuselage 2 and further by operating the modulating valves at the entrances to the manifolds 38 and 52 for the nacelle fans 46 and 56. More specifically, moving the louvers in member 37 to direct the thrust of the air flow rearwardly develops a forward thrust component which propels the aircraft A forwardly. This rearward movement is controlled by the transition lever 88. On the other hand, moving the louvers in member 37 toward a closed position directs the thrust on the aircraft A in a lateral sense for yaw control. This lateral movement is tied into the rudder 12 and is controlled by the foot pedals within the cockpit.

The thrust of air from the nacelles 40 and 54 creates downwardly directed air currents off the nacelles and in the vicinity of the impennage. To prevent these air currents from striking the horizontal surface 14, it is rotated to an angular position in which the surface is parallel to the air currents and is not affected thereby.

In the vertical mode, the aircraft rises directly up from its ground position, and eventually an altitude is reached at which it is safe and convenient to commence the transition to forward flight. To initiate the transition mode, the vectoring louvers 37A and 37B in the nose of the fuselage 2 are directed slightly rearwardly and the vectoring nozzles 50 and 60 on the nacelles 40 and 54 are retracted slightly so that the thrusts are likewise directed slightly rearwardly. This transition is achieved by operating the transition lever 88 in the cockpit. As a result, aircraft A accelerates in the forward direction and as it accelerates the louvers 37A and 37B are moved still further and the vectoring nozzles 50 and 60 are likewise retracted still further. Hence, the rate of acceleration increases. During the forward acceleration through the transition mode, the horizontal surface 14, which is tied into the transition lever 88, moves to the normal horizontal position. As the aircraft A gains speed through the transition mode, the wing 4 assumes a greater proportion of the lift.

Throughout the transition mode, the fans 46 and 56 draw ambient air through the nacelles 40 and 54 at a considerably greater velocity than that of the aircraft A. This induces high velocity air flow over the wing surface directly ahead of the nacelles. As the nacelle lips 48 and 58 are set at their bottoms flush with the upper surfaces of the wing 4, the high velocity flow directly over the upper surface of the wing 4 maintains a desired boundary layer effect. This augments the lift produced by the wing 4 and the wing 4 becomes effective for lift purposes at a much lower speed. Furthermore, the fans 46 and 56, by reason of the flush positioning of the nacelles in which they are housed, tends to maintain the flow over the top surface of the wing 4, and this, in turn, reduces the tendency to stall. In other words, it permits higher angles of attack.

When the aircraft A reaches a forward velocity sufficient to sustain normal aerodynamic flight, the vectoring nozzles 50 and 60 are brought to their fully nested cruise positions and the lift fan 36 is shut down by closing the shutoff valves 84 and 86 in the longitudinal ducts 30 and 32 respectively.

The aircraft A may also land in a vertical descent by following the opposite sequence of that described. Since the aircraft A is capable of ascending and descending vertically, only a small ground or landing area is required for landing and takeoff. In contrast to some aircraft which duct the gases of the jet engines to nozzles and eject them from the nozzles at high velocity for lift and control purposes, aircraft A hereof uses the gases to power the fans 36, 46 and 56 which in comparison discharge the fan air at relatively low velocity (low disk loading). As a result, noise and downwash are decreased and the temperature of the downwash is quite low. Also, less debris is circulated, thereby reducing the possibility of ingestion by the engines 18 and 20 or the fans 36, 46 and 56.

Moreover, the use of the fans 36, 46 an 56 creates a high bypass system which provides far greater thrust at low velocities than pure turbojet systems. Indeed, bypass ratios up to 10:1 may be utilized in normal operation. This means that the weight of air drawn into and discharged from a fan exceeds the weight of the gases which power the fan by a factor of 10. Those gases from the gas turbine engines 18 and 20, of course, are discharged into the airstreams generated by the fans 36, 46 and 56 and supplement the thrust exerted thereby. The high bypass system has an augmentation ratio of about 2.5:1, meaning that the combined thrust of the three fans 36, 46 and 56 is 2.5 times the thrust obtainable from the engines 18 and 20 alone when operated as pure jets.

While fan pressure ratios of about 1.3:1 are available for lift off in the vertical mode, even greater pressure ratios of about 1.5:1 are available for the cruise mode. The pressure ratio is derived by dividing the pressure on the downstream side of the fan blade and stator by the pressure on the upstream side, and of course, is an indication of the pressure increase across the fans. The availability of higher pressure ratios during the cruise mode results from the fact that the two engines 18 and 20 power only the two fans 46 and 56 during that mode, whereas during the vertical mode, the two engines 18 and 20 power the three fans 36, 46 and 56.

The high pressure ratios during the cruise mode enable the aircraft A to attain high velocities approaching those of conventional fixed wing aircraft. On the other hand, extremely low pressure ratios are also available during the cruise mode for sustained loiter flight during which fuel is conserved. This is achieved by shutting down one of the engines 18 or 20 and letting the remaining engine power the two fans 46 and 56. Bypass ratios as high as 20:1 may exist during loiter flight.

In the foregoing description of operation it has been the purpose to impart the understanding that the gas turbine engines 18 and 20 were fully operative at all times. However, the present aircraft has certain distinct advantages from the view point of possible malfunction of one engine. With reference to FIG. 8 it is to be understood that in normal cruise flight mode should either engine 18 or 20 go out the back pressure from the still operating engine will immediately close the appropriate engine isolation valve 90 or 92, and because the decrease in the velocity of gas flow into the respective manifolds 38 and 52 the sensors in the control center 88A will immediately regulate the split entry valves 94 and 96 to shut off one-third of the manifold capacity. This control function, transmitted to the valves 94 and 96 through the motor means 95 and 97 respectively will effectively maintain the gas velocity driving the turbine tip fans 46 and 56 so that there will be substantially no great loss in thrust for maintaining the flight capability of the aircraft.

In reference to the vertical flight mode, if one engine goes out the remaining engine will be capable of delivering high energy gas flow to the manifolds for all three fans through the control center 88 regulating the valves 94, 96 and the appropriate one of the valves 84 or 86 so that one-third of the manifolds 38 and 52 will be functional and one-third of the manifold 34 will be functional to maintain the necessary gas flow velocity for driving the respective fans 36, 46 and 56.

In the start up operation of the engine system for the present aircraft the interconnect valve 28 is normally closed so that the starting of engine 18 will not create a back pressure against engine 20 to prevent its normal starting proceedure. At other times in the normal operation of the aircraft the interconnect valve 28 will be opened so that in the event of one engine going out there will be no delay in the gas flow to all three fans if the aircraft is in vertical flight mode or to two fans when in normal cruise mode.

In addition to the flight modes above described, the aircraft is capable of loiter flight with one engine 18 or 20 operating so as to conserve fuel, as well as flight in the transition and vertical modes with just one engine 18 or 20, but the engine is of course operated at higher power settings than during loiter flight. Thus, the aircraft A possesses the safety and versatility of conventional multi-engine aircraft, with the further advantage that during operation with less than all engines, the thrust is distributed uniformly so that no control problems are created. During operation with one engine, the isolation valve 90 or 92 for the idle engine is closed.

The aircraft A need not take off and land in the vertical mode, but may also do so in the transition mode at relatively low forward velocities. Hence, short landing strips may be used. Consequently the aircraft A also has short takeoff and landing (STOL) capabilities.

This invention is intended to cover all changes and modifications of the example of the invention herein chosen for purposes of the disclosure which do not constitute departures from the spirit and scope of the invention.

What is claimed is:

1. In a trifan aircraft the combination of: a fuselage having a forward end and an aft empennage, a fixed wing mounted on said fuselage and having an upper surface on each side of and faired into the side of said fuselage, a pair of nacelles mounted on the upper surface of said wing, one nacelle at each side of said fuselage and extending rearwardly along said wing upper surface from air inlets spaced behind the aircraft center of gravity, a thrust fan operably mounted in each of said nacelles, gas turbine engines on said aircraft and provided with exhaust gas flow ducts, means in each nacelle forming a fan driving connection to said exhaust gas flow ducts to receive engine exhaust gas for driving said fans, a third fan operatively mounted in said forward end of said fuselage, manifold means at said third fan connected to said exhaust gas flow ducts to receive engine exhaust gas for driving said third fan, and fan exhaust flow directing means carried by said nacelles and by said manifold means in positions to direct the thrust of the fan exhaust flow selectively in directions to initiate positive lift of the aircraft in a generally vertical direction, and propulsion of the aircraft in a generally horizontal direction.

2. The aircraft of claim 1 wherein said flow directing means comprise nozzles movable on said nacelles between a generally vertically vectored position and a generally horizontally vectored position, and third fan vectoring means movable between a generally vertically vectored position and a generally rearwardly vectored position, whereby said wing mounted thrust fans and said fuselage mounted third fan are effective for aircraft propulsion in lift, control, transition between vertical and cruise, and cruise flight.

3. The aircraft of claim 2 wherein said nacelle nozzles are spaced aft of the aircraft center of gravity a distance substantially one-half the spacing of said third fan ahead of the center of gravity, whereby the vectored thrust from said fans substantially eliminates upsetting pitching moments during transition flight.

4. The aircraft of claim 1 wherein said nacelle mounted fans and said third fan have substantially the same high bypass characteristics.

5. The aircraft of claim 1 wherein said gas turbine engines on said aircraft are submerged in said fuselage, and said gas flow ducts extend outwardly into connection with said means in each nacelle forming the fan driving connection.

6. The aircraft of claim 1 wherein said gas turbine engines on said aircraft comprise a pair of such engines and said exhaust gas flow ducts include a cross-flow connection between said pair of engines, flow control valve means in said ducts, and engine exhaust isolation means operable to isolate a non-functioning engine, whereby said functioning engine supplies exhaust gas to drive all of said fans.

7. In an aircraft the combination of a fuselage, a fixed wing mounted on said fuselage and having a leading edge, upper and lower surfaces and a trailing edge, gas generator engines submerged in said fuselage, nacelles mounted on the upper surface of said wing at each side of said fuselage, a turbine tip fan operable in each nacelle, a turbine tip fan operably mounted in said fuselage ahead of said wing leading edge and delivering vertically downwardly directed thrust, gas flow ducts connecting said engines to said nacelles to deliver gas for driving said turbine tip fans and connected to said fuselage mounted turbine tip fan for driving said turbine tip fan, said nacelles having air inlets faired into said wing upper surface for producing high induced lift through supercirculation of ambient air over said wing upper surface, and flow vectoring means at each nacelle to direct the thrust of the fan flow selectively for vertical and horizontal flight.

8. An aircraft according to claim 7, and further comprising other flow vectoring means for vectoring said downwardly directed thrust of the fan located in said fuselage both rearwardly and laterally.

9. An aircraft according to claim 7, wherein the fuselage mounted turbine tip fan discharges air ahead of the center of gravity for the aircraft and the vectoring means causes the air from the cruise fans to be discharged downwardly at locations behind the center of gravity, whereby the center of gravity is located within a triangle having its apexes at the downwardly directed airstreams created by the fans.

10. An aircraft according to claim 7, wherein valves are provided for controlling the flow of high energy gases into the fans, the valves for the fans being operable independently of one another.

11. An aircraft comprising a fuselage; a fixed wing on said fuslage; and means for discharging downwardly directed airstreams from three locations on the aircraft and with sufficient force to exceed the weight of the aircraft for vertical flight thereof, said airstream discharge means for one of said locations being a fan rotating about an upright axis and being in the fuselage ahead of the center of gravity and the other two airstream discharge means being fans rotating about generally horizontal axes and being disposed externally of and at the sides of the fuselage generally to the rear of the wing, the three locations forming the apexes of a triangle and the center of gravity for the aircraft being within the triangle, whereby a stable tripod is developed for supporting the aircraft, and a pair of gas generating turbine engines carried within said fuselage and connected to each of said airstream discharge means.

12. In an aircraft having a fuselage and a fixed wing on said fuselage having leading and trailing edges and with an upper surface; the improvement of a nacelle structure on the wing at each side of said fuselage, each nacelle having an ambient air inlet, a portion of which is flush with said wing upper surface, powered fan means in each nacelle to induce air flow and generate high lift through the circulation of the ambient air over said wing upper surface, each of said wing nacelles being provided with an adjustable exhaust nozzle located adjacent said wing trailing edge, other powered fan means in said fuselage spaced ahead of said wing leading edge, adjustable flow directing means adjacent said other powered fan means, said adjustable exhaust nozzles and adjustable flow directing means being movable between positions for powering the aircraft in generally vertically directed flight and positions for generally horizontal flight, and pilot control means connected to said exhaust nozzles and said adjustable flow directing means to effect adjustments thereof, said pilot control means in said generally horizontal flight of the aircraft effecting closure of said ajustable flow direct-means at said other powered fan means and stoppage of said latter fan.

13. In an aircraft the combination which comprises: a fuselage; a wing on said fuselage; a first fan operably mounted in said fuselage ahead of said wing to rotate on a generally vertical axis; a first gas flow manifold adjacent said first fan to deliver gas for driving the fan, flow vectoring means adjacent said first fan and selectively operable to direct first fan flow vertically down and aft; a nacelle mounted on said wing at each side of said fuselage; a pair of other fans mounted one in each of said nacelles to rotate on a generally horizontal axis; other gas flow mainfolds adjacent said other fans to deliver gas for driving the fans; flow vectoring means on each nacelle and selectively operable to direct other fan flow generally aft and vertically down; a pair of gas turbine engines on said aircraft having exhaust gas outlets; duct means connecting one of said engines with a portion of said first manifold and with one of said other manifolds, and connecting the other of said engines with a different portion of said first manifold and with the other of said other manifolds; a cross-flow duct connecting said duct means to each engine; a plurality of valve means operably mounted in said duct means to direct engine exhaust gas to said first and other manifolds for driving said first and other fans to develop aircraft flight producing propulsion; and pilot control means connected to said valve means and to said flow vectoring means to select in a desired sequence vertical, transition and cruise flight modes of the aircraft, said valve means being operable by said pilot control means to continue flight of the aircraft with one engine inoperative.

* * * * *